(No Model.) 2 Sheets—Sheet 1.
R. P. CURTIS.
PIPE THREADING MACHINE.

No. 443,502. Patented Dec. 30, 1890.

WITNESSES:
J. P. Finch
Chas. H. Fleming

INVENTOR
Roderick P. Curtis
BY F. W. Smith
ATTORNEY (No Model.) 2 Sheets—Sheet 2.

R. P. CURTIS.
PIPE THREADING MACHINE.

No. 443,502. Patented Dec. 30, 1890.

WITNESSES:

INVENTOR
Roderick P. Curtis.
BY
ATTORNEY

UNITED STATES PATENT OFFICE.

RODERICK P. CURTIS, OF SOUTHPORT, ASSIGNOR TO CURTIS & CURTIS, OF BRIDGEPORT, CONNECTICUT.

PIPE-THREADING MACHINE.

SPECIFICATION forming part of Letters Patent No. 443,502, dated December 30, 1890.

Application filed March 28, 1890. Serial No. 345,700. (No model.)

*To all whom it may concern:*

Be it known that I, RODERICK P. CURTIS, a citizen of the United States, residing at Southport, in the county of Fairfield and State of Connecticut, have invented certain new and useful Improvements in Pipe-Threading Machines; and I do hereby declare the following to be a full, clear, and exact description of the invention, such as will enable others skilled in the art to which it appertains to make and use the same.

My invention has reference to pipe-threading machines, but especially refers to that class of such machines in which a rotary die-carrying ring is provided with a "lead-screw," which co-operates with a nut to draw said ring toward the pipe to be threaded.

Prior to my invention the lead-nut has been formed with the casing, and this construction, while it has no serious defects, nevertheless makes no provision for cutting off the pipe, and it has been customary hitherto to introduce special means whereby the action of the lead-screw may be arrested at any time.

My present invention has for its object to do away entirely with any immovable lead-nut, and to provide a simple means whereby the sliding movement of the die-carrying ring may be arrested at any desired time.

Figure 1:
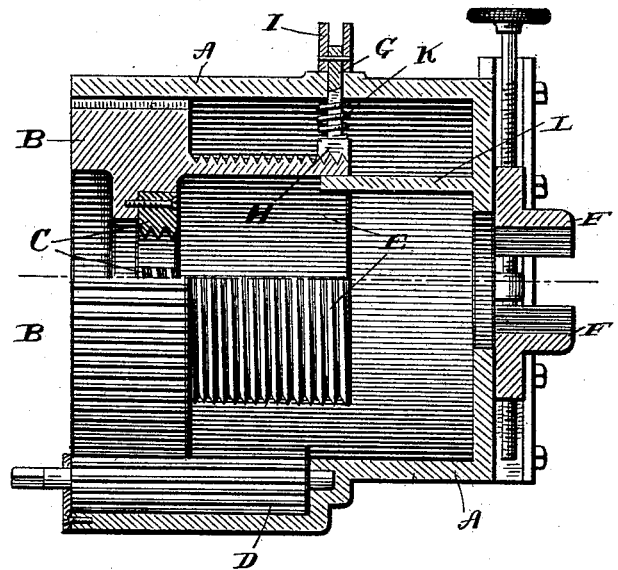
Figure 2:
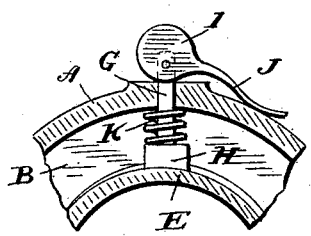
Figure 3:
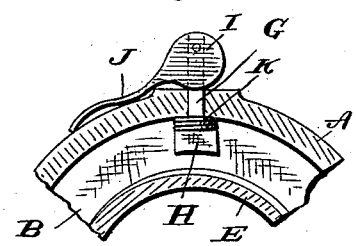

In the accompanying drawings, Figure 1 is a sectional elevation of a pipe-threading machine provided with my improvement; Fig. 2, a detail broken sectional elevation showing particularly the position of my improved lead-block and the operating means therefor when the screw and lead block are in engagement; Fig. 3, a view similar to Fig. 2, but showing the position of the parts when the lead-block is disengaged from the lead-screw; and Fig. 4, a sectional elevation of a pipe-threading machine provided with a compound lead-screw, whereby pipes may be threaded with a different number of threads to the inch and also provided with my improved lead-blocks.

Similar letters denote like parts in the several figures of the drawings.

A is the casing; B, the die-carrying ring; C, the threading-dies, (only two being shown;) D, the pinion which meshes with the cogs on the die-carrying ring to rotate the latter; E, the lead-screw extending rearward from said ring, and F the vise-jaws for holding pipe.

Extending loosely through the rim of the casing is the shank G of the lead-block H, which latter has threads on its under side adapted to engage with the threads on the lead-screw.

I is a cam, within which the upper end of the shank G is pivoted, and J is a lever extending from said cam.

K is a coil-spring around the shank and bearing against the inner wall of the casing and the top of the block H, whereby the latter is normally depressed into engagement with the lead-screw. When said block and lead screw are in engagement the cam rests at its shortest radius against the casing, as shown at Fig. 2; but when the cam is operated to raise the block out of engagement with the lead-screw, said cam rests at its longest radius against the casing, as shown at Fig. 3. The cam is readily operated by means of the lever J.

By the use of my improvement it will be seen that the inward movement of the ring may be stopped at any time by simply raising the lead-block and spreading the dies.

I provide an arm L extending from the rear of the casing within the lead-screw, whereby the latter may be constantly supported to counteract any tendency of the same to tip and cause undue friction between the ring B and the casing or pinion.

Figure 4:
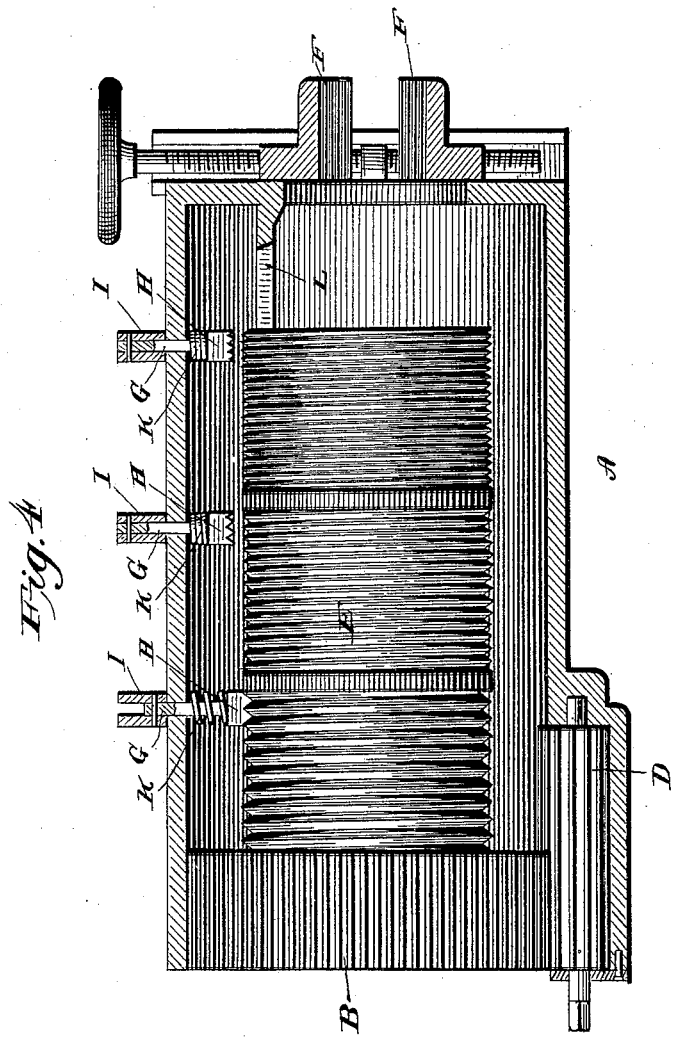

The effectiveness of the machine is greatly increased by the use of my improvement, since I am enabled to utilize several distinct lead-screws which all extend integrally from the ring, and which all differ in respect to the number of threads to the inch. In this instance I would use as many of my lead-blocks as there are lead screws, as shown in Fig. 4, it being of course understood that only one lead-block would be in engagement with its opposite lead-screw during the operation of cutting a thread. In fact, the several lead-screws cannot be used except in connection with separate lead-blocks or their equivalents, and the construction at Fig. 4 is therefore so closely associated with my invention as to really form a part thereof.

Having thus fully described my invention, what I claim as new, and desire to secure by Letters Patent, is—

1. In a pipe-threading machine having a rotary die-carrying ring provided with a lead-screw, and a spring-actuated lead-block adapted to normally engage with said screw, in combination with means, as a cam, for raising said block out of engagement with said screw, substantially as set forth.

2. In a pipe-threading machine, as described, the combination, with the lead-screw of the die-carrying ring, of a lead-block adapted to be engaged with and disengaged from the lead-screw, and means, as a cam, for operating said block, substantially as set forth.

In testimony whereof I affix my signature in presence of two witnesses.

RODERICK P. CURTIS.

Witnesses:
F. W. SMITH, Jr.,
J. P. FINCH.